Feb. 7, 1956  A. A. KORBY  2,733,561
LAWN MOWER SHARPENER
Filed March 15, 1954

INVENTOR.
Alfred A. Korby
BY Victor J. Evans & Co
ATTORNEYS

United States Patent Office 2,733,561
Patented Feb. 7, 1956

2,733,561

LAWN MOWER SHARPENER

Alfred A. Korby, Duluth, Minn.

Application March 15, 1954, Serial No. 416,036

5 Claims. (Cl. 51—250)

This invention relates to lawn mower sharpeners of the type permanently installed on a lawn mower and normally retained in spaced relation to the cutting edges of the spirally disposed blades, and in particular a sharpening stone carried by a bracket pivotally mounted on a lawn mower with the stone adapted to be positioned to be engaged by the cutting blades of the mower and having a foot actuated latch for retaining the stone in spaced relation to the blade, resilient elements for urging the stone toward the blade, and adjustable stops for limiting the travel of the stone toward the blades, whereby upon release of the foot latch the stone is drawn by the resilient means into a suitable grinding position in relation to the cutting blades.

The purpose of this invention is, therefore, to provide a permanently installed lawn mower sharpener that is drawn into sharpening position in relation to blades of a lawn mower by resilient means when a retaining latch is released by a foot of an operator of the lawn mower.

Numerous types of lawn mower sharpeners have been provided, however, when sharpening stones of this type are permanently installed on a lawn mower they either engage the cutting edges of the blades continuously or are set by a screw driver or wrench to engage the blades as desired. Where the blades are engaged continuously the cutting edges of the blades wear rapidly and where the position of the stone is adjusted by a screw driver or wrench it is very seldom used because tools for adjusting the positions thereof are not available. With this thought in mind this invention contemplates a sharpening stone adapted to be installed on a lawn mower whereby the stone is urged toward cutting blades of the mower by springs and wherein the stone is retained in spaced relation to the cutitng blades by a foot actuated latch.

The object of this invention is, therefore, to provide a lawn mower sharpener that is readily adjustable to operative and inoperative positions by a foot actuated trip.

Another object of the invention is to provide a foot actuated lawn mower sharpener that is adapted to be installed on lawns mowers now in use.

A further object of the invention is to provide a foot actuated lawn mower sharpener in which the sharpener and mounting means therefor are of simple and economical construction.

With these and other objects and advantages in view the invention embodies a substantially U-shaped bracket adapted to be pivotally mounted on a lawn mower, a sharpening stone carried in the bracket, arms having adjusting screws in ends thereof extended from the bracket, springs connected to the arms and to stationary parts of the lawn mower, a latch for retaining the bracket with the stone spaced from blades of the mower and an arm extended from the bracket for returning the bracket to a position with the stone spaced from the blades of the mower.

Other features and advantages of the invention will appear from the description taken in connection with the drawings, wherein.

Figure 1:
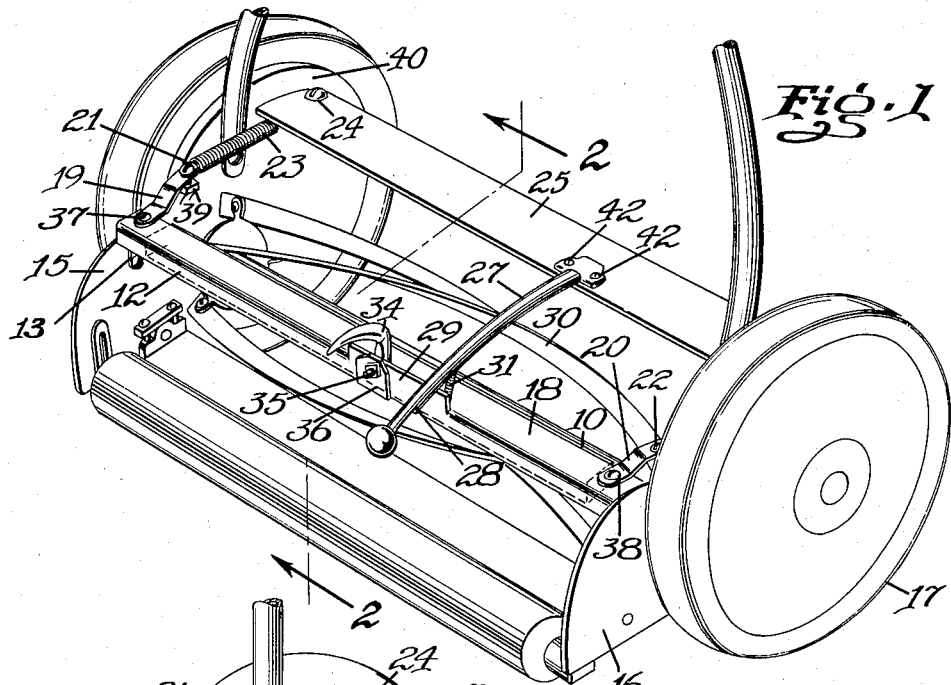
Figure 1 is a perspective view showing a lawn mower with the improved sharpener attachment thereon, and showing the device with the stone in the inoperative position.

Referring now to the drawing wherein like reference characters denote corresponding parts the improved lawn mower sharpener of this invention includes a sharpening stone 10 positioned in a frame having a base 11 with a flange 12 on the outer side and the stone is retained in the frame with arms 13 which extend downwardly at the ends and which are pivotally mounted with bolts 14 in end plates 15 and 16 of the lawn mower, as indicated by the numeral 17. The frame is provided with an upper plate 18 and arms 19 and 20 extended forwardly from the plate 18 are provided with adjusting screws 21 and 22. The frame is urged forwardly by springs 23 that are attached to the arms 19 and 20 with the screws 21 and 22, the opposite ends of the springs being secured by bolts 24 to a shield 25 that is mounted on the transversely disposed bar 26 of the lawn mower.

Figure 3:
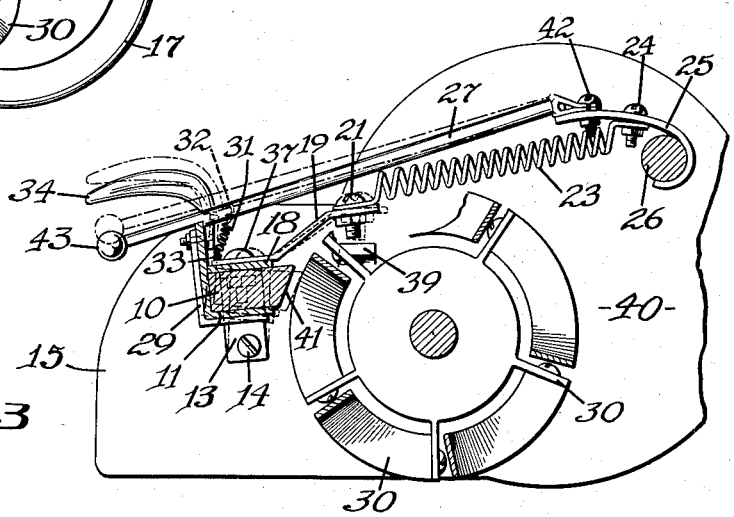
Figure 3 is a cross section similar to that shown in Fig. 2 with the parts shown on an enlarged scale and showing the sharpening stone in the inoperative position in full lines and in the sharpening position in broken lines.

The frame with the stone 10 therein is retained in spaced relation to the cutting blades of the lawn mower with a latch bar 27, on the lower part of which is a tooth 28 that is positioned to engage a projection 29 extended upwardly from the flange 12 to retain the parts in the positions, as illustrated in Fig. 3, wherein in the full line position, the stone is spaced from the cutting blades 30 of the lawn mower. The latch bar 27 is retained in the position of holding the stone in spaced relation to the cutting blades by a spring 31, one end of which extends through an opening 32 in the latch bar 27 and the opposite end of which is secured to an eye 33 on the upper plate 18.

The attachment is also provided with an arm 34 that is adapted to be engaged by the foot of an operator for drawing the frame away from the cutting blades and the arm 34 is secured to the projection 29 by a bolt 35 that also extends through a reinforcing clip 36 which is positioned against the flange 12 and projection 29 and which also extends across the lower surface of the base 11 of the frame.

Figure 2:
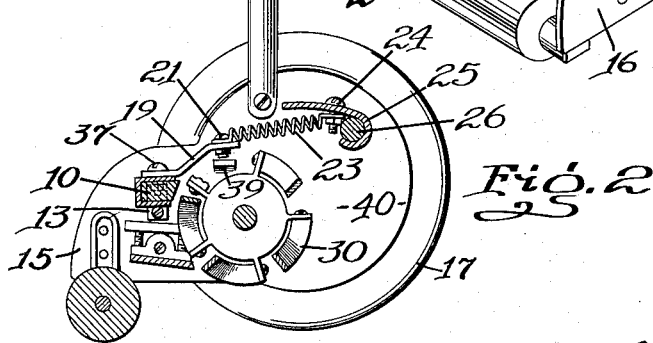
Figure 2 is a cross section through the lawn mower taken on line 2—2 of Fig. 1 also showing the sharpening stone in the inoperative position.

The arms 19 and 20 are secured to the plate 18 with bolts 37 and 38, respectively and, as illustrated in Fig. 2 the adjusting screws 21 and 22 are positioned to engage lugs, such as the lugs 39 positioned on discs 40 providing inner surfaces of the wheels of the lawn mower. Where lugs, such as the lugs 39 are not provided on lawn mowers, similar lugs or other obstructions may be welded to the stationary discs forming the inner surfaces of the wheels, of the mower.

It will be understood that with the screws 21 and 22 adapted to engage the lugs 39 the contact of the beveled edge 41 of the sharpening stone with the blades 30 of the lawn mower may be regulated so that the stone is in a suitable grinding or sharpening position.

In the design shown, wherein the lawn mower is provided with a shield, such as the shield 25 the latch bar 27 is secured to the shield with bolts 42 and it will be understood that the latch bar may be secured to the shield by other means and may also be secured directly to the transverse bar 26 when shields are not provided.

With the parts provided and assembled in this manner the sharpening stone 10 is retained in spaced relation to the cutting blades 30 of the lawn mower by the tooth 28 of the latch bar 27 as the lawn mower is used, and when it is desired to sharpen the blades the operator kicks a knob 43 on the end of the latch bar 27 upwardly, thereby releasing the frame and permitting the springs 23 to draw the frame with the stone 10 therein toward the cutting blades 30 until the adjusting screws 21 and 22 engage the lugs 39. By adjusting the screws 21 and 22 a suitable sharpening or grinding action may be obtained. After the blades 30 of the lawn mower are sharpened the foot of the operator is placed on the arm 34 whereby the stone 10 is drawn from the position shown in broken lines in Fig. 3 to that shown in full lines and with the latch bar drawn downwardly by the spring 31 the tooth 28 engages the upper edge of the projection 29, thereby retaining the frame and sharpening stone in the full lined position shown in Fig. 3 with the stone spaced from the cutting edges of the blades.

This attachment may be supplied independent of the lawn mower and may readily be installed upon lawn mowers by a layman.

It will be understood that modifications, within the scope of the appended claims, may be made in the design and arrangement of the parts without departing from the spirit of the invention.

What is claimed is:

1. The combination of a blade sharpening device and a lawn mower comprising a substantially U-shaped frame having a base with arms depending from ends thereof, a sharpening stone positioned on said base, said arms at the ends of the base having bolts in extended ends thereof adapted to pivotally mount the base on the lawn mower with the stone positioned to be engaged by cutting blades of the mower, a shield mounted on the lawn mower a latch connected at one end to said shield for holding the base with the sharpening stone in spaced relation to the blades, resilient means connected to the shield and frame for urging the sharpening stone toward the cutting blades, adjustable means mounted on the frame for limiting the movement of the sharpening stone toward the cutting blades, and an arm positioned to be engaged by the foot of an operator for pivoting the frame for moving the sharpening stone away from the cutting blades.

2. In an attachment for use on a lawn mower, the combination which comprises an elongated frame having depending arms with bolt holes in lower ends thereof positioned at the ends of the frame, a sharpening stone carried by said frame, a shield adapted to be mounted on a lawn mower, a latch bar mounted on the shield and positioned to retain the frame in the position wherein the stone is in spaced relation to the cutting blades, resilient means for urging the frame with the stone therein toward the cutting blades, adjustable means mounted on the frame for restricting the movement of the sharpening stone toward the blades, and resilient means for urging the latch bar into engagement with said frame for retaining the frame with the stone in spaced relation to the cutting blades to prevent accidental release of said latch bar.

3. In a lawn mower blade sharpener, the combination which comprises a substantially U-shaped frame, L-shaped in cross section having a base with a flange at one side and having depending arms at the ends, said arms being adapted to pivotally mount the frame on a lawn mower, a sharpening stone positioned on the frame and adapted to engage the lawn mower blade, forwardly and upwardly disposed arms extended from the ends of the frame, a shield adapted to be mounted on a stationary part of a lawn mower, springs connecting the extended ends of the arms to the shield on the stationary part of the lawn mower, adjusting screws in the extended ends of said arms for limiting movement of the frame toward the lawn mower blade, a latch bar mounted on the shield and positioned to engage the frame in which the sharpening stone is positioned for retaining the sharpening stone in spaced relation to the lawn mower blade, and means connected to the latch bar and frame for urging the latch bar toward the L-shaped frame of the sharpening stone.

4. In a lawn mower sharpener, the combination which comprises a substantially U-shaped frame having a longitudinally disposed base with a flange at one side and with depending arms at the ends, the lower ends of the depending arms having bolts therein adapted to mount the frame between end plates of a lawn mower, a sharpening stone having a beveled outer surface mounted on said base, a cover plate positioned on said sharpening stone, forwardly extended arms mounted on said cover plate, adjusting screws carried by extended ends of the forwardly extended arms and positioned to engage lugs on the inner surfaces of the end plates of a lawn mower for limiting forward movement of the frame and sharpening stone, springs extended from the ends of the forwardly extended arms for urging the frame with the stone therein toward cutting blades of a lawn mower upon which the attachment is positioned, a latch bar adapted to be mounted on the lawn mower and having a tooth on the under surface positioned with the tooth adapted to engage a projection of the flange of the frame upon which the sharpening stone is mounted, and resilient means urging said latch bar toward said frame for retaining the tooth of the latch bar in engagement with the projection of the flange of the frame.

5. The combination of a blade sharpening device and a lawn mower comprising an elongated substantially U-shaped frame having a base with depending arms at the ends, a sharpening stone mounted on said base, bolts mounted in the ends of the frame adapted to pivotally mount the frame on a lawn mower with the sharpening stone adapted to be positioned to be engaged by blades of the lawn mower, a shield mounted on the lawn mower, springs extended from ends of the frame and connected to the shield for urging the sharpening stone against the blades of the mower, adjusting screws mounted on the frame for limiting movement of the sharpening stone toward the blades of the mower, and a latch bar mounted on the shield and having a tooth engaging the said frame for retaining the sharpening stone in spaced relation to blades of the lawn mower.

References Cited in the file of this patent

UNITED STATES PATENTS

| | | |
|---|---|---|
| 575,335 | Davidson | Jan. 19, 1897 |
| 617,584 | Leshure | Jan. 10, 1899 |
| 989,291 | Richardson | Apr. 11, 1911 |
| 1,027,114 | Ewe et al. | May 21, 1912 |
| 1,071,195 | Windle | Aug. 26, 1913 |
| 1,086,389 | Miller | Feb. 10, 1914 |
| 1,091,750 | Miller | Mar. 31, 1914 |
| 1,163,950 | Patterson | Dec. 14, 1915 |
| 1,432,193 | Lancaster | Oct. 17, 1922 |
| 2,016,777 | Grantham | Oct. 8, 1935 |
| 2,032,731 | Wilson et al. | Mar. 3, 1936 |
| 2,362,400 | Randle | Nov. 7, 1944 |
| 2,399,437 | Herbert | Apr. 30, 1946 |